United States Patent [19]

Muntner et al.

[11] Patent Number: 5,465,780
[45] Date of Patent: Nov. 14, 1995

[54] LASER MACHINING OF CERAMIC CORES

[75] Inventors: Michael S. Muntner, Killingworth; James S. Perron, Madison, both of Conn.

[73] Assignee: AlliedSignal Inc., Morris Township, N.J.

[21] Appl. No.: 157,228

[22] Filed: Nov. 23, 1993

[51] Int. Cl.⁶ .............................. B22C 9/00; B22C 9/10; B22D 31/00
[52] U.S. Cl. ..................... 164/516; 164/369; 164/70.1
[58] Field of Search .................. 164/369, 228, 164/229, 516, 165, 166, 35, 70.1, 72

[56] References Cited

U.S. PATENT DOCUMENTS

| | | | |
|---|---|---|---|
| 4,322,601 | 3/1982 | Serlin | 219/121 |
| 4,401,876 | 8/1983 | Cooper | 219/171 |
| 4,455,893 | 6/1984 | Astero | 76/107 |
| 4,467,172 | 8/1984 | Ehrenwald et al. | 219/121 |
| 4,475,027 | 10/1984 | Pressley | 219/121 |
| 4,606,747 | 8/1986 | Steinhoff | 65/31 |
| 4,842,782 | 6/1989 | Portney et al. | 264/1.4 |
| 4,914,270 | 4/1990 | Copley et al. | 219/121.68 |
| 4,952,789 | 8/1990 | Suttie | 219/121.68 |
| 4,970,600 | 11/1990 | Garnier et al. | 358/299 |
| 4,978,830 | 12/1990 | Millerick et al. | 219/121.67 |
| 4,986,664 | 1/1991 | Lovoi | 356/376 |
| 5,295,530 | 3/1994 | O'Connor et al. | 164/516 |
| 5,296,308 | 3/1994 | Caceavale et al. | 164/516 |
| 5,329,985 | 7/1994 | Weimann | 164/229 |

FOREIGN PATENT DOCUMENTS 49-13695  4/1974  Japan .................. 164/72

Primary Examiner—P. Austin Bradley
Assistant Examiner—I.-H. Lin
Attorney, Agent, or Firm—James W. McFarland

[57] ABSTRACT

A method is disclosed for producing a hollow airfoil, specifically, a blade or vane for a gas turbine engine, which is formed with a complex interior for cooling purposes. Broadly, the method comprises the steps of molding a green ceramic core having outer surfaces generally contoured to produce the intended interior surfaces of the completed airfoil, heating the green ceramic core to a sufficient extent to produce a fired core, and operating on the fired core with a laser to modify the characteristics of the fired core. Use of the laser enables the formation of detailed features having a transverse dimension less than approximately 0.020 inches. Specific operations may include labeling, trimming, cutting, drilling either by punching or trepanning, etching or milling, and glazing or strengthening. In another embodiment of the invention, a layer is produced on the core surface having a very high surface energy to promote the flow of the casting alloy around the core within the mold.

62 Claims, 7 Drawing Sheets

LASER MACHINING OF CERAMIC CORES

BACKGROUND OF THE INVENTION

I. Field of the Invention

The present invention relates generally to the manufacture of hollow turbine blades and, more particularly, to an improved method of manufacturing to readily and accurately obtain complex hollow passage geometry required for modern turbine blades.

II. Description of the Prior Art

Modern turbomachinery utilizes airfoils which are variously referred to as vanes or blades. Blades, sometimes called "buckets", rotate and are used in disk assemblies of one type or another. Vanes, sometimes called "stators", do not rotate and are found in stationary parts such as nozzles, cases, diffusers, and similar types of turbine engine parts.

Blades, in turn, can be referred to as integral or separate. Integral blades are bonded to and/or part of a disk (sometimes called a "blisk") or ring (sometimes called a "bling") assembly. In these cases, there is not real root area to consider unless after bonding a noticeable material or structural dissimilarity still exists between the original disk or ring and the original blade. When the original blade and the original disk or ring are produced together (integrally) there is no noticeable difference in structure and therefore never a reference to "roots". Separate blades are produced having precision machined roots which are assembled into machined disks.

Vanes also come in two varieties: separate or integral. In this instance, "integral" means cast at the same time as the nozzle's inner or outer shrouds. Separate vanes are cast as individual vanes and then either fastened, brazed or bicast into the inner and outer shrouds.

Because of the high operating temperatures of most turbines, many turbine blades as well as turbine vanes require air cooling to keep their operating temperature below the melting point. As engines become more and more demanding on their hardware, the cooling schemes employed internal to the airfoils increase in complexity. It becomes more difficult to achieve the desired cooling passage configuration and its complexity, particularly in the very small airfoils envisioned for the future.

Cooling passages are desirably central to the airfoil. That is, they are "balanced" in the cross section of the airfoil so that the wall thicknesses on either side of the passage are neither too thin or too thick. Wall thickness does not have to be uniform throughout and may vary either intentionally to locally control cooling effectiveness or unintentionally due to normal process variation. Cooling passages may be serpentine like with parallel or near parallel passages running lengthwise through the airfoil connected by near 180° bends at either end. There may occasionally be cross overs between the passages. Usually the cooling passage has one end which exits the airfoil at its root. The other end exits through either the top or the trailing edge of the airfoil. Some passages "dead end" in the airfoil. That is, the passage has only one exit to the outside. These are called "blind" passages. Cooling air entering the passage effuses out of the blind passage through minute holes drilled through the airfoil walls into this passage. Passages are formed within an airfoil (either blades or vanes) during the investment casting process by means of a ceramic core which exhibits the exact shape of the hollow passage geometry being sought. With respect to the surrounding metal in the airfoil, the core is like a negative. For example, if it is desired that a metal post project into a cooling passage, this positive feature (that is, the post) would require a corresponding negative feature in the core (that is, a hole).

Heretofore, it has been customary to use machined tools and dies to inject core material into die cavities in order to obtain the features desired. Features whose smallest dimension is greater than approximately 0.020 inches can usually be produced today using conventional core technology. However, for features dimensioned smaller than that value, conventional core technology is inadequate. For features dimensioned as small as approximately 0.005 inches, the laser has been found to be an excellent tool.

Laser machining, however, does have a history. For example, U.S. Pat. No. 4,606,747 to Steinhoff and U.S. Pat. No. 4,401,876 to Cooper both disclose contact-less removal of material from the surface of an article of brittle material by means of a laser beam. U.S. Pat. No. 4,978,830 to Millerick et al. discloses automatic apparatus for laser trimming semiconductor integrated chip packages. U.S. Pat. No. 4,986,664 to Lovoi, U.S. Pat. No. 4,952,789 to Suttie, and U.S. Pat. No. 4,914,270 to Copley et al. all disclose methods and apparatus for the controlled laser removal of material from a substrate. U.S. Pat. No. 4,970,600 to Garnier et al. and U.S. Pat. No. 4,467,172 to Ehrenwald et al. both disclose methods and apparatus for engraving a workpiece by means of a laser. U.S. Pat. No. 4,475,027 to Pressley discloses apparatus comprising a laser and optical beam homogenizer which is useful for metal hardening, semiconductor hardening, and other materials processing applications. U.S. Pat. No. 4,322,601 to Serlin discloses a method and apparatus for alloying the surface of a substrate by use of a laser beam.

It was in light of the prior art, typical examples of which have just been described that the present invention was conceived and has now been reduced to practice.

SUMMARY OF THE INVENTION

According to the invention, a method is disclosed for producing a hollow airfoil, specifically, a blade or vane for a gas turbine engine, which is formed with a complex interior for cooling purposes. Broadly, the method comprises the steps of molding a green ceramic core having outer surfaces generally contoured to produce the intended interior surfaces of the completed airfoil, heating the green ceramic core to a sufficient extent to produce a fired core, and operating on the fired core with a laser to modify the characteristics of the fired core. Use of the laser enables the formation of detailed features having a transverse dimension less than approximately 0.020 inches. Specific operations may include labeling, trimming, cutting, drilling either by punching or trepanning, etching or milling, and glazing or strengthening. In another embodiment of the invention, a layer is produced on the core surface having a very high surface energy to promote the flow of the casting alloy around the core within the mold.

An object, then, of the invention is to provide an improved method for producing hollow turbine airfoils.

Another of the invention is to provide a method for more readily and accurately producing turbine airfoils with complex internal passage geometry.

A further object of the invention is to produce such turbine blades in which features within the hollow internal of each airfoil have dimensions smaller than 0.020 inches.

Still another object of the invention is to provide a method of operating a laser to form specified detailed features on a fired core to achieve the desired internal features for a completed airfoil.

Yet another object of the invention is to operate a solid state laser at a level of power such that the laser beam only superficially ablates the surface of the fired ceramic core to form indicia thereon which will, subsequently, upon completion of the molding process be x-ray readable on the interior surfaces of the completed blade.

Yet a further object of the invention is to operate a laser at a level of power such that the laser beam modifies the fired ceramic core by, alternatively, trimming, cutting, drilling by either punching or trepanning, etching or milling, and glazing or strengthening.

Still another object of the invention is to provide such a system in which a coating of a wetting material is applied to the surface of the fired core, such wetting material having a surface energy in excess of 750 dynes per centimeter. Yet another object of the invention is to provide such a coating wherein the wetting material is a metallo-organic compound containing at least one metal having a high melting point selected from the group consisting of (1) those metals listed in the Periodic Table in Group 1-b: copper, silver, gold; (2) those metals listed in the Periodic Table in Group 8-b: iron, ruthenium, osmium; (3) those metals listed in the Periodic Table in Group 9-b: cobalt, rhodium, iridium; and (4) those metals listed in the Periodic Table in Group 10-b: nickel, palladium, platinum.

Still a further object of the invention is to provide such a system according to which a core surface, so modified, is further coated with nickel by means of an electroless process.

Yet a further object of the invention is to provide such a system according to which a core surface, so modified, is further coated variously with titanium diboride and with titanium carbide, utilizing ion sputtering techniques.

Still another object is to provide such a system according to which a core is provided with such a surface layer by means, variously, of electroplating, chemical vapor deposition, and physical vapor deposition.

Other and further features, advantages, and benefits of the invention will become apparent in the following description taken in conjunction with the following drawings. It is to be understood that the foregoing general description of the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numerals refer to like parts throughout the disclosure.

DETAILED DESCRIPTION OF THE PREFERRED EMBODIMENTS

Figure 1:
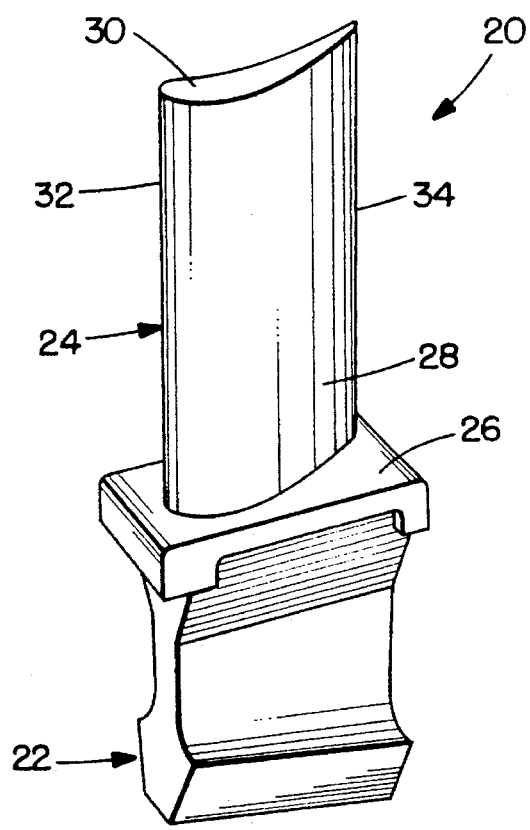
FIG. 1 is a detail perspective view generally illustrating a turbine blade embodying the teachings of the present invention.

Turn now to the drawings and, initially, to FIG. 1 which generally depicts a turbine blade 20 which embodies the present invention. Throughout this disclosure, the word "blade" will be used solely, but will be understood to mean "vane" as well as "blade". The turbine blade 20 is depicted as including both a root portion 22 and an airfoil portion 24, with a platform 26 at the interface between the root portion and the airfoil portion. The airfoil portion extends between an inboard region 28 and an outboard region 30 and between a leading edge 32 and a trailing edge 34.

Figure 2:
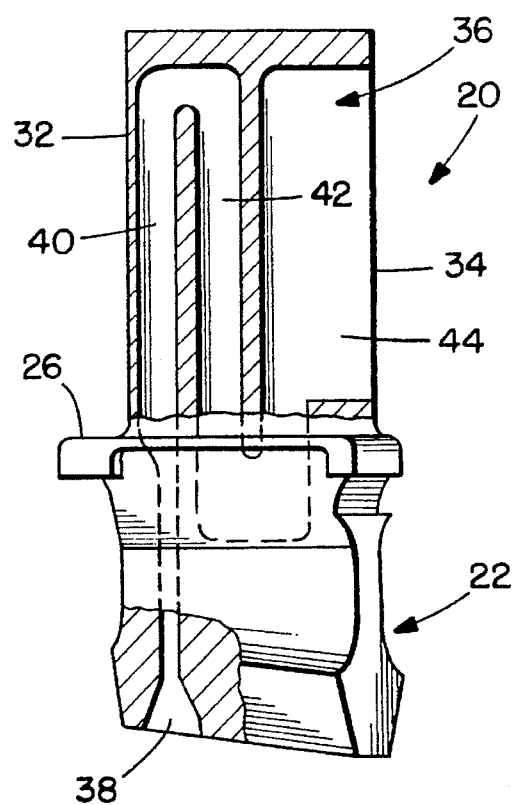
FIG. 2 is a detail side elevation view, certain parts being broken away and shown in section, of the turbine blade illustrated in FIG. 1.

With the airfoil portion being cut away and shown in section, FIG. 2 illustrates the internal structure of the blade 20 provided with internal cooling passages 36. Because of the high operating temperatures of most turbine engines, many turbine blades require air cooling to keep their temperature below the melting point. As operating requirements become more and more demanding on hardware, the cooling schemes employed internal to the airfoils increase in their complexity. It has become more and more difficult to achieve satisfactory cooling passage configurations which have become increasingly complex and will become even more so in the future.

In FIG. 2, the internal cooling passages 36 are illustrated as including a root air entry 38, a leading edge pass 40, a second pass 42, a trailing edge pass and exit 44, an extremity of which is coincident with the trailing edge 34. It will be understood that the configuration illustrated is only for purposes of explanation and that, in actual fact, blade cooling designs can utilize any number of passages and configurations of passages depending only on the imagination of the designer and the restrictions of space.

Figure 3:
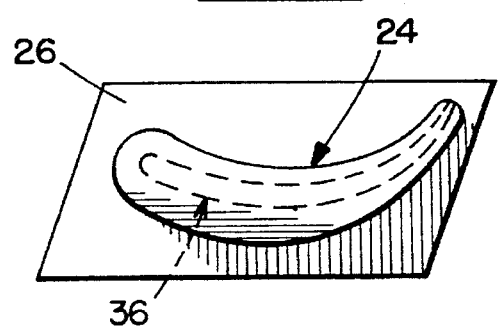
FIG. 3 is a detail top plan view of the turbine blade illustrated in FIGS. 1 and 2.

FIG. 3 illustrates a top plan view of the blade 20 shown in FIGS. 1 and 2. In FIG. 3, a dashed line is used to show how this passage is somehow central to the airfoil portion. That is, the internal cooling passages are "balanced" in the cross section of the airfoil portion 24 such that the wall thicknesses on either side of the passages are neither too thin nor too thick. Viewing both FIGS. 2 and 3, one can see that the internal passages proceed down through the airfoil portion 24 and through the root portion 22 and exit through the extreme bottom of the root portion 22.

The internal cooling passage system 36 is formed within the blade 20 in the course of an investment casting process. A ceramic core 46, as illustrated in FIG. 4, has the exact shape, in negative, of the hollow internal passage geometry being sought. That is, with respect to the surrounding metal in the blade 20, the core 46 is like a negative. More specifically, if it is desired that a metal post project into a cooling passage, this positive feature (that is, the post) would require a corresponding negative feature in the core, namely, a hole.

The core 46 of FIG. 4 illustrates a number of typical features commonly found on a core, especially a core of the type used to produce a modern hollow turbine blade 20. However, the core 46 is illustrative of one which has been produced using the techniques of the present invention and which, therefore, exhibits even finer and more detailed features than were possible previously. Throughout the ensuing description, references to the negative of each of the features will be by wording which describes the positive feature. For example, reference to a hole in the core which will result in a pin in the completed blade will be to the pin, that is, to the positive emulation of the hole.

It will be recognized that features whose smallest dimension is above approximately 0.020 inches can usually be produced today using conventional core technology. Transversely, for features with transverse dimensions less than approximately 0.020 inches, laser machining is preferred. Of course, a decision whether or not to use a laser for machining in a particular instance may be dependent on the beam of the laser, more particularly, its size and shape. Features whose transverse dimensions, or spot size, are as small as approximately 0.003 to 0.005 inches can be produced with relative ease. Then too, as laser optics improve or lasers are employed having higher frequencies, the spot size will diminish enabling even finer work to be performed. The decision whether or not to use a laser may also be related to stress. That is, using a non-contact material removal method (namely, a laser) may be preferred to alternative material removal methods which rely on mechanical, abrasive, or pressurized flow techniques which can impart a higher stress to the ceramic core increasing its likelihood for damage.

At the bottom of the internal cooling passage system 36 to be formed by the core 46 are turning vanes 64. The turning vanes maintain a smooth flow of air around the bends in the cooling passages. Once the air begins to separate from the walls of the passages, it becomes turbulent, there are hot and cold spots, and the efficiency and effectiveness of the cooling air stream suffers. Thus, the turning vanes guide the air around the passage bend and prevent the formation of little vortexes in the corners of the passages. The turning vanes 64 actually improve the flow efficiency through the cooling passage system even though they occupy valuable room in the cross section of the core.

Many of these features illustrated in FIG. 4 would be very difficult, or impossible, to make utilizing conventional techniques. A number of these typical features will now be described. For instance, at a leading edge 48 of the core 46 (to the left side of the core, viewing FIG. 4), it can be seen that there is a blind passage 50. That is, the passage 50 has been formed so that it is isolated from a main leading edge core passage 52 and is held to the main body of the core by some very small ceramic bridges, or crossovers 54. The crossovers 54 may have transverse dimensions substantially less than 0.020 inches. The main leading edge core passage is in communication with the root air entry 38, that is, the negative of root air entry illustrated in FIG. 2. At the extreme leading edge of the core 46, there are a plurality of serrations, or edge ribs 56. The edge ribs 56 may typically have transverse dimensions in the range of 0.020 inches to 0.005 inches. Proceeding to the right in FIG. 4, the viewer can see a plurality of troughs, or trip strips 58, extending diagonally across the surface of the core. The trip strips 58 may have transverse dimensions in the range of 0.020 inches to 0.005 inches. Continuing farther down the internal passage, there are a series of holes in the core which will later form cross pins (pedestals) 60, 62. The cross pins 60 may have diameters in the range of 0.010 inches to 0.020 inches while the cross pins 62 may have diameters in the range of 0.005 inches to 0.015 inches. Laser processing of cores can produce features as large as those which can be formed by conventional methods and as fine as those measured in microns, depending on the choice of lasers and processing systems.

Figure 4A:
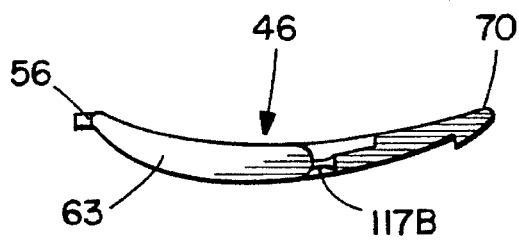
FIG. 4A is a top plan view of FIG. 4.
Figure 4:
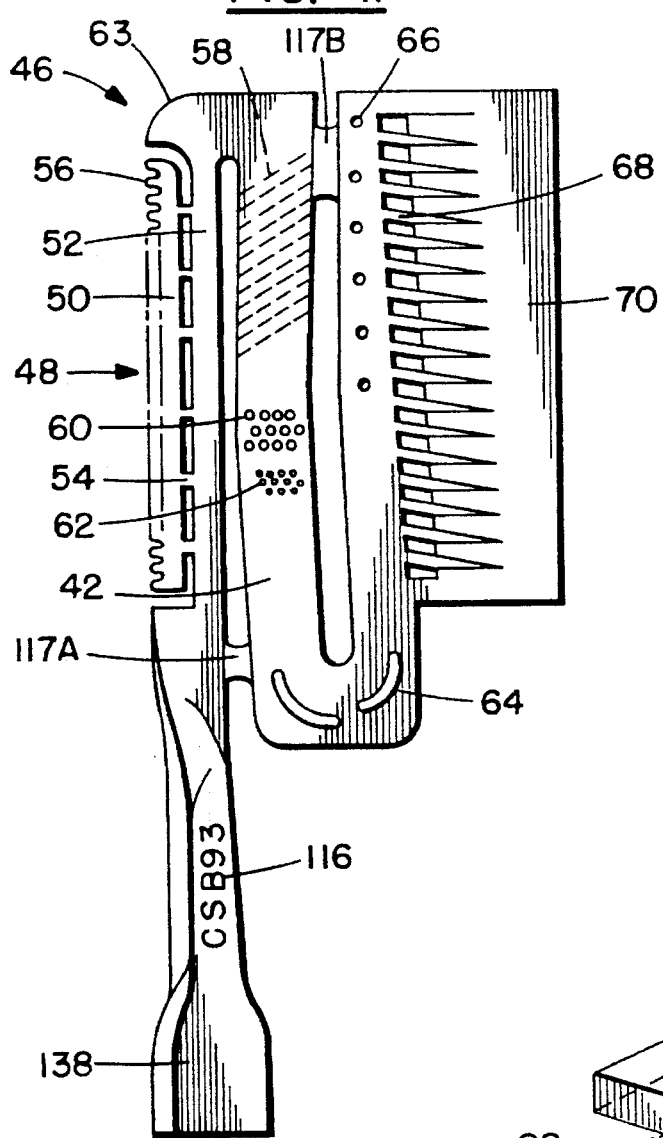
FIG. 4 is a side elevation view of a ceramic core modified in accordance with the teachings of the present invention and resulting in the turbine blade of FIGS. 1, 2, and 3.

FIG. 4A is a top plan view of the core 46 and you can see, for instance, a first bend 63 in the core which extends from the leading edge core passage 52 to the second pass 42. Also to be seen in this figure are the edge ribs 56 and the trailing edge pass and exit 44.

There are some features illustrated in FIG. 4 for which conventional techniques would be adequate and might even be preferred. For example, another feature on this core called "pin fins" 66 are relatively large features having a transverse dimension of approximately 0.030 inches. They resemble buttons in the completed metal blade. Correspondingly, they are depressions, or blind holes, in the ceramic core 46. These pin fins 66 are typically formed with the original core during core injection, that is, during the casting process. Although the laser is preferably not used to introduce these features into the core in the first instance, the laser can be subsequently be put to good use to clean out debris or foreign material which finds its way into those blind holes in the core as a result of the core injection operation.

Proceeding farther towards the trailing edge (to the right, FIG. 4), trailing edge exits 68 are formed in the core 46. These are little ribs and little windows between these ribs. At the extreme right side of the core 46 is a trailing edge core print 70.

When a core is conventionally formed, that is, injected into a die in a manner to be described, the two die halves are brought together and, depending on the tolerances and wear and tear on the dies, it is customary for a thin sliver of ceramic material to form at the interface of the die halves This ceramic material, referred to as "flash", squeezes out from between the two faying die halves. That sliver of excess material has to be removed and smoothed out before the core can be used for investment casting purposes. The core making industry currently uses little deburring tools, both diamond and carbide, to remove this flash. As the size of core features become smaller, it becomes increasingly more difficult to get into these very small features with mechanical deburring or deflashing tools. If one can get into a particular feature, there is a high probability that the tool forces will damage or break the fragile ceramic core. This is true regardless of location or type of the feature. Robotics or automated, versus manual, deburring techniques have helped to some extent but are not the final solution. Aside from the inherent difficulty in mechanically manipulating a deburring tool in the fine fragile features of cores (as core size miniaturizes), there is currently a physical size limitation as to how fine a diameter one can obtain and use a deburring tool. Once a deburring tool becomes finer than approximately 0.025 inches in diameter, rotation at deburring speeds becomes most difficult. Strength diminishes rapidly with smaller sizes and dimensional stability drops off rapidly. However, with a laser, it is possible to burn away or melt away or ablate away the flash with minimal trauma to the core and without resulting breakage. Hence, the laser need not only be used to cut features into the core, but may also be used to trim away the flash that develops in a conventional die-formed core.

Figure 5A:
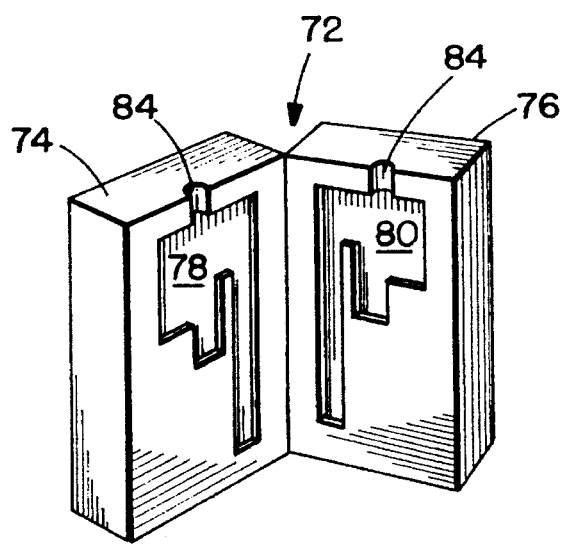
FIG. 5A is a detail perspective view illustrating a core die in an open position representing a first step in the method of the invention.
Figure 5B:
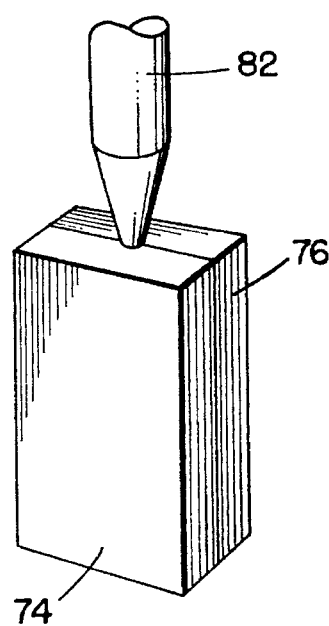
FIG. 5B is a detail perspective view illustrating the core die of FIG. 5 in a closed position and representing a subsequent step in the method of the invention.
Figure 5C:
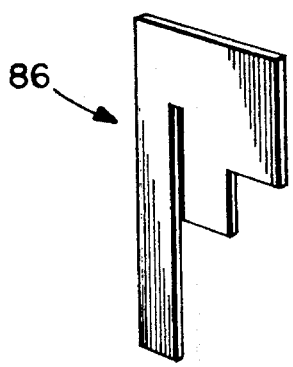
FIG. 5C is a detail perspective view of a green or unfired core resulting from the step illustrated in FIG. 5B.

Turn now to FIGS. 5A, 5B, and 5C for a description of the initial steps in the casting process. In time, it will become clear how the present invention alters a conventional casting process. Initial tooling for the casting process is a core die 72 which is a set of two metal core die blocks 74, 76 (FIG. 5A) which may be hinged together for pivotal movement between an open position (FIG. 5A) and a closed position (FIG. 5B). When the die blocks 74, 76 are closed, mutual depressions 78, 80 therein together define a cavity formed inside which is the exact replica of the core sought to be formed. The die blocks 74, 76 are closed and they inject what's called a core body (FIG. 5B) with a ceramic-based slurry mixture, often proprietary and typically comprising ceramic oxides, binders, plasticizers, and firing aids to enhance sintering. This is injected via a nozzle 82 through a suitable entry hole 84 until the cavity and all of its interstices are filled. Upon completion of the injection process, the die blocks 74, 76 are opened and a green or unfired core 86 is ejected (FIG. 5C).

In a next step of the casting process, it is necessary to "fire" the green unfired core 86 and harden it for further processing. The green unfired core has no substantial strength and must be supported to ensure that it will retain its desired shape until it is subjected to a "hardening" step.

There are basically two ways to support a green core about to be inserted into a kiln. One method is to gently place the newly injected green unfired core 86 on a bed of refractory sands that will not bond together during firing, and then put more of this "sand" top of it, thereby burying it. The bed of refractory sands and contained unfired core 86 therein is then carefully moved into the kiln for the firing operation.

Figure 5D:
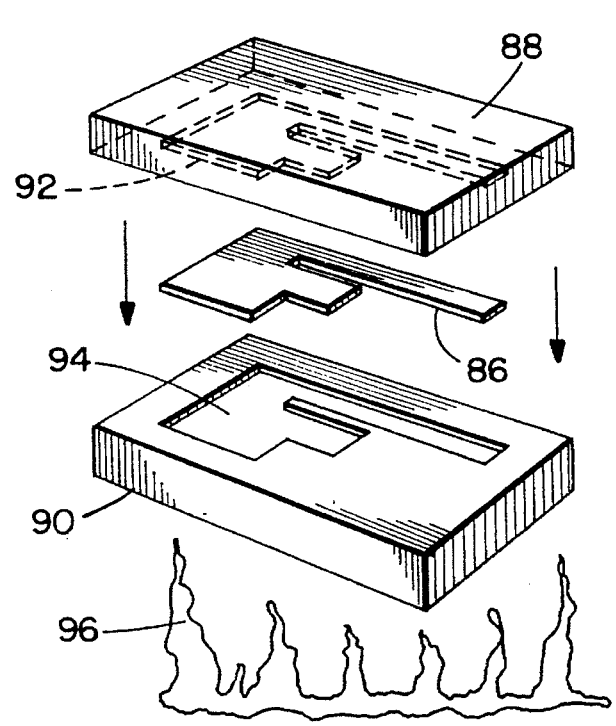
FIG. 5D is a detail perspective view, exploded, illustrating another subsequent step in the method of the invention and intending to result in a fired core.

Another way of supporting the green unfired core 86 is by use of setter blocks 88, 90 (FIG. 5D). The pair of mutually cooperating setter blocks 88, 90 are illustrated, diagrammatically and in exploded fashion, in FIG. 5D with the green or unfired core 86 positioned for supportive reception by opposed, mating, hollows 92, 94 formed therein. The hollows generally conform to the shape and size of the green unfired core 86. Thus, before placing the green unfired core 86 into a kiln, diagrammatically represented by a flame 96, for "firing", the setter blocks provide the necessary support to assure that it will not creep and start to sag under the high temperatures present in the kiln. The setter blocks are ceramic blocks which will not bond to the core during firing. As noted above, these blocks, when assembled, form a cavity similar to the cavity formed by the core's original injection dies. The main difference is that they are toleranced to allow the core to undergo its normal consolidation shrinkage without adhering to the blocks. The green cores are placed one per cavity per setter block set and the top of the setter block set is placed on top of the bottom block. These assemblies (combined setter blocks and cores) then are placed into the kiln for firing.

Firing is the next step of the casting process in which the green core is heated up to high temperatures, usually above 2000° F. and held at that temperature long enough to drive or burn off all of the plasticizers and other binders, and to begin a natural sintering process. At this time the individual micrograins of ceramic particles begin to bond together via diffusion and to some extent aided by sintering aids and the formation of small amounts of glassy phases which begin to form and flow in and around these grains. This is the consolidation process for the core. When completed, the setter blocks 88, 90 are again separated and the resulting, now-fired but unfinished, core 98 removed from the hollows 92, 94. Although firing produces a product, the fired core 98 which is stronger than the green core 86, it remains fragile and brittle at room temperatures.

It will be appreciated that dies (not shown) are used for fabricating the setter blocks 88, 90. These same dies might be used for making another set of setter blocks 100, 102 (FIG. 6) to be employed in the next step of the blade casting process, specifically during laser machining of the fired core 98 which will eventually result in the finished core 46. In the instance of the setter blocks 100, 102, it is preferred that they be formed of epoxy rather than the usual castable ceramic because it can be easily machined. Also, unneeded or unwanted portions of the setter blocks can be readily removed by laser burning or in some other suitable manner which can be done much more easily with epoxy than with ceramic.

Figure 6:
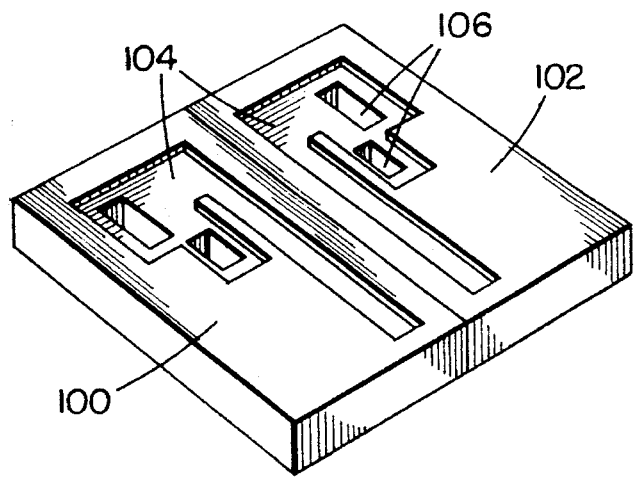
FIG. 6 is a detail perspective view of paired setter blocks for performing another subsequent step in the method of the invention.
Figure 7:
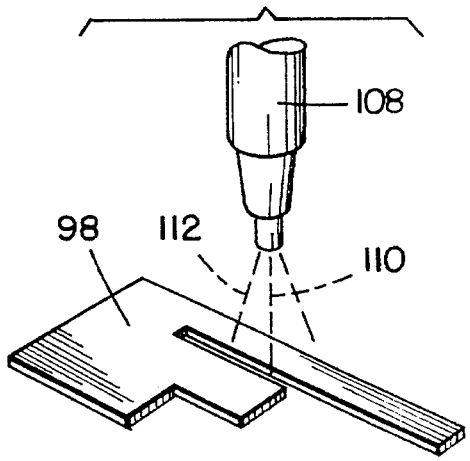
FIG. 7 is detail perspective view of another subsequent step in the method of the invention, specifically, of operating on the fired core with a laser to modify the characteristics of the fired core.

Thus, for example, viewing FIG. 6, the setter blocks 100, 102 have supporting recesses 104 which are shaped and sized substantially similar to the depressions 78, 80 of the die blocks 74, 76. However, additionally, it is desirable to remove portions of the under side of the supporting recesses in specified locations using the same laser that will be used to do the core machining. These specified locations are indicated as deep recesses 106. For this purpose, it is customary to determine which areas on the epoxy setter blocks will be located directly beneath the core areas being laser machined (see FIG. 7). A suitable laser 108 is then set up to pass over this area on the setter block, again and again, to evaporate or burn away all the epoxy material or at least to a desirable depth. It is desirable to remove the epoxy from behind the core at those locations which will require removal of material from the core. This is because of the nature of laser cutting. Laser cutting does not merely involve use of a beam 110 of photons. Rather, the process also involves a jet or stream 112 of compressed air, or gas (FIG. 7), blowing either coaxially or at some appropriate angle to the object being cut. The purpose of this gas jet is two fold: (1) it flows in such a manner so as to create a barrier to debris, plasma, vapors, and the like from reaching the sensitive optics of the laser; and (2) the jet is also used to "blow" the molten material which forms around the beam out of its path. As laser cutting through the core 98 proceeds, it is desirable to make certain that there is nothing directly behind the core to stop or inhibit the free expulsion of debris and slag. This helps insure smoother cut surfaces and reduced build up of material on adjacent surfaces.

It will be appreciated, however, that materials other than epoxy could be used for the setter blocks 100, 102. Other materials could be used so long as they properly support the fired core 98 during the laser machining process and are reasonably easy to machine.

Figure 8:
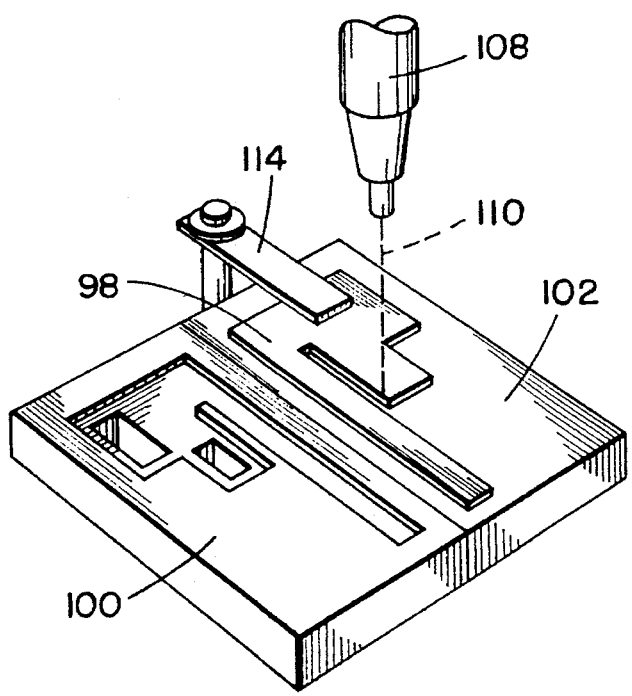
FIG. 8 is a detail perspective view generally combining the showings of FIGS. 6 and 7 and illustrating an additional component.

FIG. 8 illustrates a matched pair of the epoxy setter blocks 100, 102 with a fired, but unfinished, core 98 supported on the setter block 102. The core is matingly received within the supporting recess 104 and the laser 108 is in the process of cutting the desired features on the core as it rests on the setter block. In FIG. 8 there is also shown a suitable clamp 114 integral with the setter block 102 for gently but firmly gripping the fired core 98 and preventing its movement relative to the setter block during the laser machining operation. The deep recesses 106 are appropriately positioned behind the core.

Consider now a number of techniques provided by the invention for operating on a fired core with a laser so as to modify the characteristics of the fired core.

In one instance, the laser can be used to label the core 46 (FIG. 4). A solid state laser is employed for this purpose, and preferably, a YAG (yttrium aluminum garnet) laser, which does not couple its energy well with the ceramic material of the core. The laser only superficially indents or ablates the core and will not burn through the target material when the beam is directed to form indicia 116 of some appropriate form on the core. Indeed, much of the energy of the YAG laser is reflected away from, or transmitted through, the target material. For labeling, it is desirable to use the YAG laser at the near infrared regime. The laser thereby only effects the surface layer of the target core. Nonetheless, one can see the indicia so applied in the x-rays of the cast part at a later time. If the indicia is strategically positioned on the core, such indicia will be clearly visible in a finished product at a later time. Since the indicia 116 is transferred to the casting on the inside of a core passage, it cannot be easily removed. It is therefore a semi-permanent way of labeling castings with such information as serial numbers, heat lot numbers, and the like. Other lasers and other laser energy wave lengths can be used for the purpose of labeling. All that is required is that the resulting labeling be superficial so as not to interfere with the function of the core but yet be discernable as described above.

Another procedure which can be advantageously performed utilizing a laser is trimming of the fired core 98. As mentioned previously, when the core is formed in the die during injection, some of the core material filling the cavity will squeeze between the faying die surfaces. Since the injection process is a process in which material is forced into the dies under some pressure, some amount of excess material will be extruded from between the die halves, particularly if there is any wear or gaps when the die blocks 74, 76 are closed. After injection, when the die blocks are opened and the green unfired core 86 is removed from the depressions 78, 80, it is customary to see a small amount of flashing in the form of a fin of the ceramic material along the parting line of the core. It is then customary for a coremaker first to file down the flashing and then to manually remove and smooth out the parting line with little burrs or drills powered by air tools. Also, tie-bars or bridges 117A, 117B of ceramic material which may be intentionally designed and added to the core for support of the ceramic material adjacent fragile serpentine core passes must be removed and polished after firing. The tie bars which are strategically located in the green core to enhance its strength and survivability through firing, is not part of the cooling scheme and are removed after the core has been fired and is stronger.

With the advance of automation, it has become common for large order jobs often to be automated. For example, a CAD/CAM system may be used to drill out all of the holes in the core and burrs are conventionally used to remove and smooth out the other parting line areas of the cores. However, when a core becomes very small and very thin, and the holes and slots in the core become ever smaller and narrower, or the geometry requiring "cleaning-up" becomes more curved or complex, there is a marked increase in breakage during core finishing.

In all of the foregoing instances, according to the invention, a laser is used to remove this flashing by blasting it away, melting it away, or vaporizing it away. Although any laser or wave length of laser energy can be employed for this purpose, the selection criteria is a combination of both technical and economic factors. Typically, some laser wave lengths couple better with specific core materials. That is, the transfer of laser light energy to the ceramic core material is more efficient with certain wave lengths. For many ceramic core materials, infrared radiation is readily absorbed. For this reason, a $CO_2$ gas laser, which is an infrared laser, is preferred. The higher the efficiency of energy absorption, the greater the degree of material removal through vaporization. This produces the most precise dimensions and minimizes adverse material effects. By using the laser, the core is not contacted by a mechanical device, is not subjected to mechanical force, and therefore is not caused to crack. In fact the heat around the area that is trimmed causes a certain amount of extra sintering which causes the core to be somewhat stronger in that region. This is an added benefit of laser machining of the fired core, namely, localized thermal treating for strengthening or for inducing material transformations of a desirable nature or eliminating those of a detrimental nature. Once again, the type of laser energy, and its operating parameters can be selected to optimize this effect.

Trimming is achieved by operating the laser at a moderate power level. However, for heavier machining operations, for example, for making holes and bores and slots and the like, the power of the laser beam is increased. As with trimming, typically, a $CO_2$ laser is used for the heavier machining operations. As previously noted, the YAG laser is used for labeling and may also be used for very light trimming. However, it has been found that the $CO_2$ laser is the desired tool for the bulk of other ceramic machining because the frequencies used couple well with the ceramic material of the core. Of course, it will be appreciated that there may be lasers in the future with different frequencies that are as good or better then those laser types. Certainly one would want to use the optimum laser frequency for a given requirement. At the present time, the $CO_2$ laser is preferred for cutting. It is reasonably effective, able to cut through thick cores, typically through ceramic material on the order of approximately one-eighth to one-quarter of an inch thick.

Figure 9:
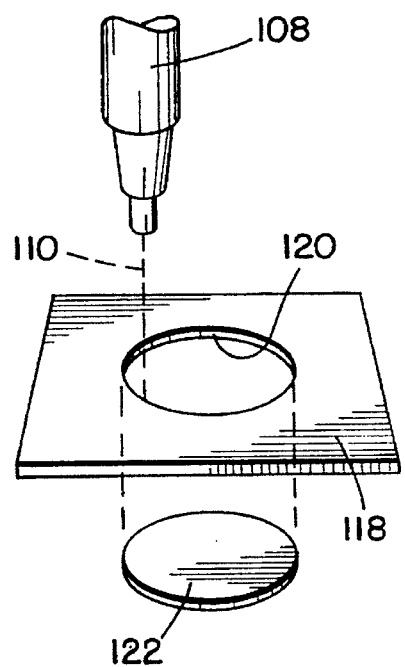
FIG. 9 is a detail perspective view illustrating another manner of operating on the fired core with the laser.

Drilling is a special form of cutting which entails punching through the core at a particular location about the diameter of the beam. Typically, holes can be punched through a core which are sized somewhere between 0.005" and 0.008" in diameter, and thinner if higher frequency lasers are employed. If a larger hole is required, it becomes necessary to perform a trepan operation. Viewing FIG. 9, it can be seen that trepanning is a process in which a hole is cut much as if one were using a saw. As illustrated therein, the beam 110 of the laser 108 is directed at a substrate 118 which may be a ceramic core. The laser beam 110 begins to cut at a defined location on the substrate as a starting point, then follows an arc 120, leaving the center solid until the starting point is again reached and a center portion 122 falls out. The center portion 122 is akin to the hole in a donut.

Figure 10:
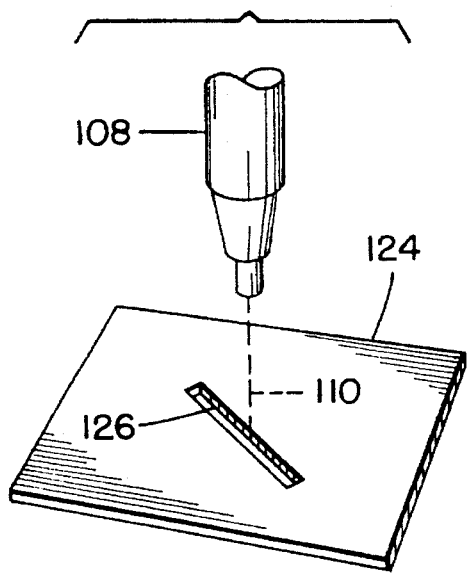
FIG. 10 is a detail perspective view illustrating still another manner of operating on the fired core with the laser.

Another type of procedure performed on a fired core by a laser is material etching or milling and is generally illustrated in FIG. 10. In this instance, the laser beam 110 does not cut through the material of a substrate 124, which may be a ceramic. Rather, the laser beam advances along the surface of the substrate 124, causing material to melt and vaporize. With a gas or air jet 112, having the nature of that illustrated in FIG. 7, impinging on the surface of the substrate but not penetrating through the substrate, the resulting molten material or slag gets blown away or pushed along. Typically, the laser type, wave length, and other parameters are selected to maximize material removal by vaporization since this results in a more precise cut. This milling operation results in the formation of a trough or groove 126 marking the locus of the motion of the laser beam. The trough is deepened by moving the laser beam across the path of the groove 126 multiple times, each time removing more material.

Still another procedure performed with the laser on a fired core is thermal treating. Thermal treating can be performed either in a general way or, more importantly, in a localized way, for sintering and strengthening, or inducing material transformations, of a desirable nature or eliminating those of phases or defects of a detrimental nature. The laser is directed at a desired location on a substrate, which may be a fired core, and is cycled according to the effects desired. The area typically will glaze over and some of the surface will melt, and densify. The resulting glassy more dense substrate is stronger than an untreated substrate. It should be noted that such a glazed densified region is a naturally occurring phenomenon when cutting is performed. In short, it has been found that there is a "laser effected area", or LEA, similar to what a heat effected zone would be to welding. In most of the effort performed leading to the present invention, it has been established that laser cut surfaces have an LEA of approximately 0.010" wide. This LEA results from the heat of the laser cutting process.

The focus of the laser can be an important consideration when focusing optics are employed. As previously noted, a solid state laser is often used for labeling and for very light trimming. In the case of labeling, especially, the laser radiated frequency is chosen so that the material is not cut into to any substantial extent. Also, the focal point of the laser is placed approximately at the surface of the material. However, for the other procedures mentioned, placement of the focal point, that is, the location of maximum power or highest energy density, is often different. For example, when drilling a hole, it is desired that maximum power be at the point of the surface that you are cutting. This result can be achieved in different ways. For very thin parts, it is customary to focus in the center thickness of the material such that there is a small amount of inefficiency "going in" and a small amount of inefficiency "coming out". With a thin section, it really makes little difference. This is especially true if a long focal length lens is being used. In thicker materials, however, it is desirable to use a z-axis on the laser workstation.

It must be appreciated that the laser is merely the equipment which generates the beam. However, the beam must be coupled through mirrors and optics and utilize a workstation which manipulates the part. Actually, when using $CO_2$ lasers, it is not customary to manipulate the laser. Instead, the beam is manipulated by moving mirrors and optics. Indeed, it is typical to have a supporting table that moves in the x-y direction. Oftentimes, a z-axis movement (up and down) capability is added to a two-axis machine. For still more complex movements, tables that rotate about each of the three axes can also be provided. Movements about all of these axes can then be controlled by a computer.

It is preferable to move the workpiece rather than the laser itself. There are some laser systems which utilize fiber optics such that the working end of a laser can be placed beam at the end of a robot arm. In that case, the fiber optics carry the beam. The YAG laser is more conducive to that sort of transmission. However, a $CO_2$ laser doesn't usually operate in that manner. When using the $CO_2$ laser, it is customary to move the object, for example, the fired ceramic core, being operated upon. The laser beam can be directed at the workpiece in several different ways, individually and in combination, as earlier mentioned, through fiber optics, focused through a suitable lens, by mirrors, and through apertures of selected sizes and shapes. The resulting beam can either be focused or parallel as it impinges onto the workpiece. When it is focused, it converges as it travels to a theoretical point in space called the "focal point" and thereafter it diverges.

When using focused laser energy, typically $CO_2$ lasers, the position of the focal point with respect to the top and bottom surface of the thickness of material being machined is an important processing parameter. Most efficient cutting usually occurs when the beam is focused into its smallest spot size. Therefore, the machining of thicker materials requires a long focal length lens or the ability to move the workpiece up the vertical axis, as the beam moves through down the material being machined. In this manner, the "focal point" is maintained as close as possible to the region of laser cutting in the material.

Of course, occasionally the geometry of the feature being laser machined or the type of laser treatment being employed, might necessitate the use of an off-focal point or shaped beam. This also can be accommodated through use of special fiber arrays, mirrors, lenses or apertures.

Another benefit to be achieved with the use of the laser on a fired ceramic core is the assistance which can be provided in rapid prototyping. That is, the laser can be used to machine a variety of core configurations from a single master core as the starting material. By choosing an appropriate master core shape, a designer can use the laser to produce for further evaluation a number of different cooling layouts. Thus, the designer can cut several different variations of geometry in the cooling passages and then evaluate which particular configuration is more effective before finalizing the design. This benefit can be achieved without requiring the expense of fabricating a large number of new die blocks 74, 76. Conventionally, it was necessary to fabricate a die for every different iteration of design. By use of the present invention, a designer can merely use an already existing master form and then cut the intricacies of the core by using a laser for that purpose.

As noted above, it is desirable for the designer using the present invention to plan out beforehand the particular configuration of the core desired to determine what sort of cuts are to be made, where a label should be placed so that it can be easily seen on x-rays later on. An additional concern is the design of a fixture to hold the core so that the operator of the laser can get to all of these various regions of the core. In this regard, it has been found that by using the epoxy setter blocks 100, 102, the core can be easily held while, at the same time, appropriate areas behind the core, the deep recesses 106, can be easily fashioned to assure that resistance to the gas and the laser beam debris that issues from behind the core during the cutting process does not occur.

In recapitulation, a designer determines the intended working agenda for the laser, develops the fixturing to be used, fabricates a number of trial core pieces providing a range of geometries for the internal cooling of a turbine blade, then tests each resulting blade design so as to choose the optimum core configuration. It is no longer customary for a designer to manually move a laser around a core. Rather, the chosen geometries are programmed into a computerized NC workstation for operating on the core. Then through trial and error, adjustments are made to the computer program until the geometry sought is achieved. In this process, each core being operated upon is set up, the laser processing performed, and then the cuts or holes or other features inspected for geometry and quality. The test core is then broken, and the cross section of the laser cut surface inspected. This is done to make certain that the cut or hole or trough has the right shape and geometry. The parameters for the laser processing are then modified to assure that minimal disturbance of the material on the core being laser processed occurs at both the front side of the core (where the beam enters the core) and at the back side (where the beam exits the core). Note that when the beam hits the core and until it burns through the core, the laser generated plasma and gas impingement jets serve to drive a substantial amount of debris forward and up out of the core. Once the laser beam has burned through the core, the gas jets and plasma blow the debris out the exit. In both instances, there is a build up or a potential to build up material around the actual cut or hole. In some cases this buildup may be geometrically undesirable. Hence, adjustments are made to the parameters to minimize the build up and to assure that anything that does stick are globular or droplet shaped beads with the tiniest of neck enabling ease of removal.

Numerous parameters for operation of the laser are employed to assure the type of cut, the shape of the cut, and the extent to which the globular buildup adheres. These parameters include: the type of laser, its wavelength, and beam characteristics, travel speed of the laser beam relative to the core being processed, gas pressure, velocity of the laser beam as it traverses the surface of the core, the dimension of the beam column, the pulse duration, whether the laser is operated in a pulse mode or in a continuous wave mode, pulse frequency and pulse energy, point of focus (that is, how the beam is positioned on the surface of the core with respect to its actual point of focus). Also, an operator will determine beam aperture, whether to use a short focal length lens, a long focal length lens, and whether to use a z-axis to move the beam in and out. Depending on the choice of laser, the operator will select whether or not to use a fiber optic delivery system or not. All of these parameters are factored into the computer program, including the geometric positioning of the beam at the beginning of the laser processing. Inspection continues until the designer obtains the exact shape and condition sought for each individual feature being formed. When trial operations are completed, the designer has a computer record of what was done. Such information is stored on tape or on disk on or other suitable media so that at any desirable future time, the optimum parameters just developed for the core can be reproduced.

Once the optimum parameters have been established and have been immortalized in a computer program, the next step is to produce the cores in a production mode. That merely entails putting the cores into the fixture, going to a home position that was preset in developing the program and instructing the system to proceed through the various steps which that particular program was designed to perform. Periodically, a designer should take a core, inspect it, and maybe break it open to check its shape to verify that no changes have occurred in the meantime. Normally it should only require a minimum amount of effort to be able to produce production cores. Of course, each core should be looked at, it should be cleaned off, and the passages inspected under appropriate magnification to ensure that foreign debris has not wedged into the features.

Figure 11:
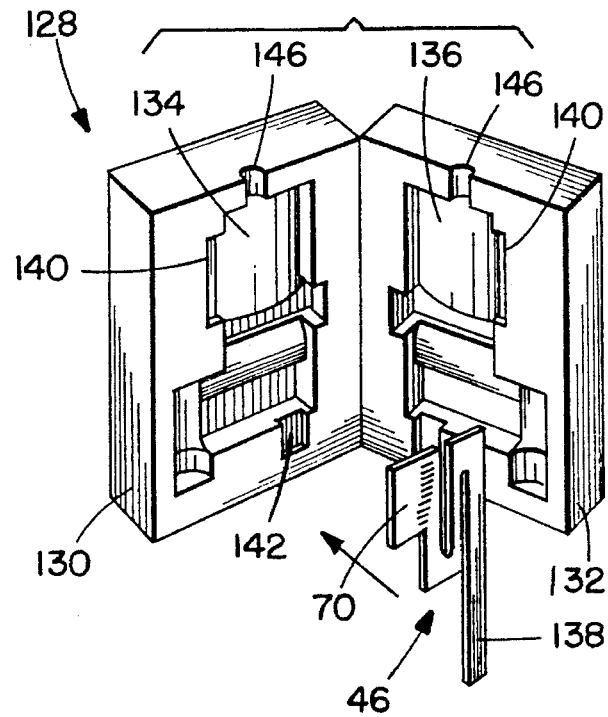
FIG. 11 is a detail exploded perspective view of a wax injection mold awaiting reception therein of the fired core for performing another subsequent step in the method of the invention.

At this stage of the casting process, a finalized configuration for the ceramic core 46 (see FIG. 4) will have been obtained. Turn now to FIG. 11 which illustrates a wax injection mold 128 about to receive the ceramic core 46 for the next step of the casting process. The mold 128 comprises opposed, mating, die halves 130, 132 with complementary die pattern cavities 134, 136, respectively, formed therein. The cavities are sufficiently large to receive the core 46 as well as a generous thickness of wax intended to envelope the core. As can be seen in FIG. 11, the core 46 includes a pair of projections, namely, a root core print 138 and the trailing edge core print 70, previously mentioned. These prints 70, 138 project from a wax pattern which will be produced by the mold 128. The wax pattern to be produced will be substantially a duplicate of the external geometry of the blade 20 and the core prints 70, 138 are intended to project from the wax pattern.

Figure 12:
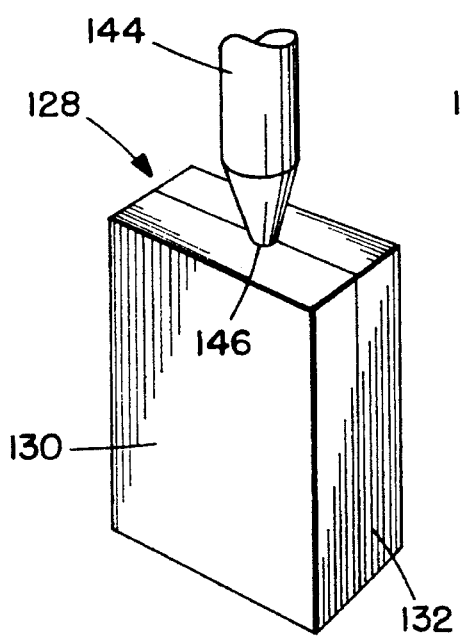
FIG. 12 is a detail perspective view illustrating the wax injection mold of FIG. 11 in a closed position and representing a subsequent step in the method of the invention.

With the die halves 130, 132 open in the manner illustrated in FIG. 11, the core 46 is placed into one or the other of the cavities 134, 136 and the die halves are closed as indicated in FIG. 12. The core prints 70, 138 provided in the core 46 at the trailing edge and root leading edge exit, respectively, are there for a specific purpose in the casting operation. Those exposed portions of the core are provided, initially, to be locked into position within the mold 128. Specifically, the trailing edge core print 70 is received in engagement with opposed die reliefs 140 and the root core print 138 is received in engagement with opposed die reliefs 142. With the core 46 so positioned in the mold 128, except at the core prints 70, 138, the surfaces of the core are spaced from the surfaces of the die pattern cavities 134, 136.

With the die halves 130, 132 closed as illustrated in FIG. 12, hot wax is injected via a suitable injector 144 through an inlet 146 complementarily formed in the die halves. When all of the interstices between the ceramic core 46 and the die pattern cavities 134, 136 have been filled with wax, the injector 144 is withdrawn and the mold 128 and its contents are cooled to room temperature.

Figure 13:
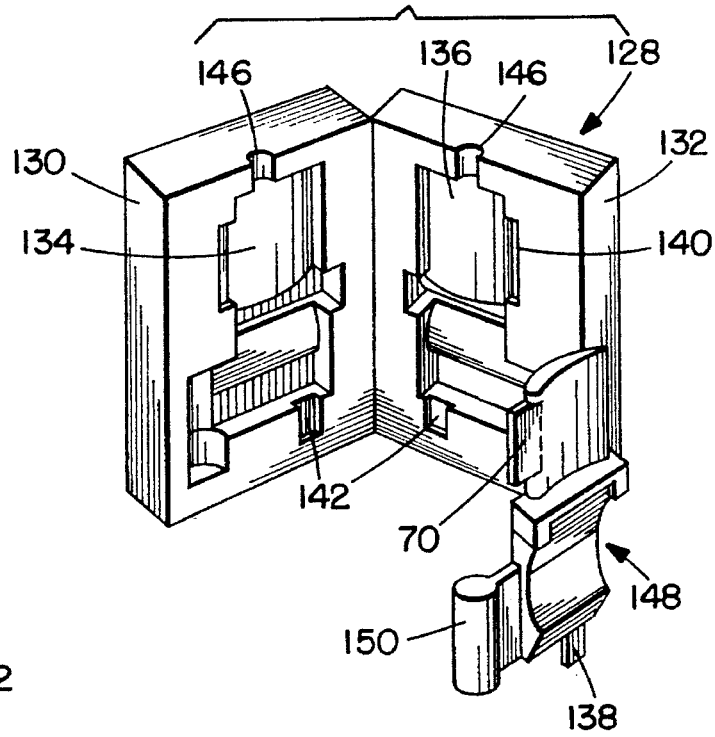
FIG. 13 is a detail exploded perspective view, similar to FIG. 11, illustrating another subsequent step in the method of the invention, specifically, of the wax injection mold from which a resulting waxed pattern is being ejected.

When the mold 128 and its contents have been sufficiently cooled, it is opened, as illustrated in FIG. 13, and yields a waxed pattern 148 which is the core 46 encapsulated with wax whose outer surfaces replicate the contours and features of die pattern cavities 134, 136. Those outer surfaces, therefore, also represent the contours and features of the blade 20 to be fabricated. Also, the space occupied by the core 46 represents the internal cooling passage system 36 to be provided within the blade. The only difference between the waxed pattern 148 and the finished blade 20 is that the core 46 actually extends out beyond what would later be the blade at locations previously mentioned as being the core prints 70, 38. As previously noted, these core prints are used to lock the core into the wax injection mold 128 and serve similar purposes in operations yet to be described. If these core prints were absent, the core would not be supported, but would remain loose in the cavities 134, 136 of the mold.

As just noted, the parts of the ceramic core 46 which are exposed, which are not covered by the wax, are the core prints 70, 138. Typically, there is some small amount of wax flashing which must be removed by hand. Also of note in the waxed pattern 148 is a wax gate 150 formed of excess wax but not intended to define the contour of the finished blade 20. The purpose for the wax gate 150 will become clear momentarily.

Figure 15:
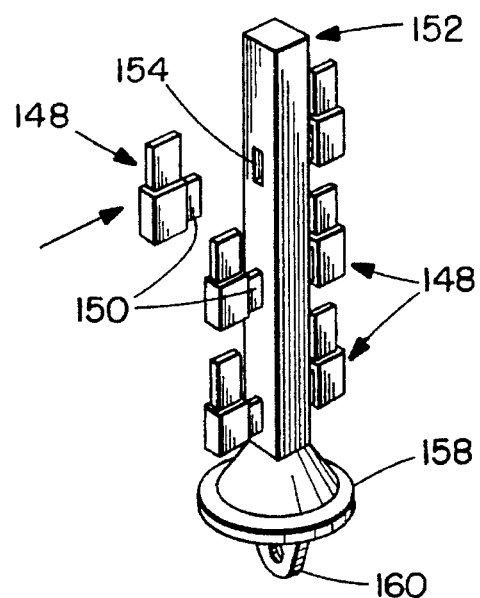
FIG. 15 is a detail perspective view of another subsequent step in the method of the invention, specifically, of attaching a plurality of the waxed patterns to a sprue.

For the next step of the process, viewing FIG. 15, a number of these waxed patterns 148, representing the form of the injected blade 20 in wax with a core 46 encapsulated in the wax, are assembled in groups on a central sprue 152 which is also made from wax. Sometimes, the wax sprue has depressions for exact location of individual wax patterns. The gate 150 of each of the waxed patterns 148 is attached to the sprue 152 at receiving depressions 154 (when used) or to the sprue's surface at determined locations. This is customarily performed by a procedure referred to as "hot knife wax welding". By means of a conventional tool (not shown) having a heated tip end, the mating surfaces of the wax gate 150 and, if used, of the receiving depression 154 are heated to the near-melting point. The wax gate 150 is then, without delay, pressed into the depression 154 or onto the sprue's surface, firmly adhering thereto.

Figure 14:
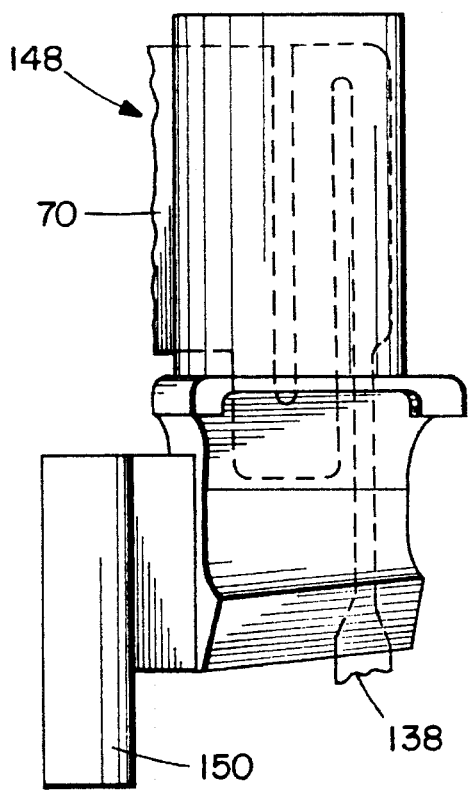
FIG. 14 is a side elevation view of the waxed pattern resulting from the step illustrated in FIG. 13.
Figure 16:
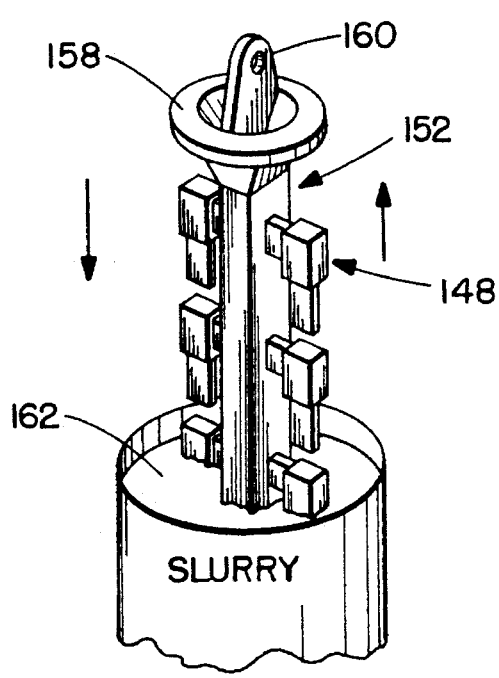
FIGS. 16 and 17 are detail perspective views of another subsequent step in the method of the invention, specifically, of slurry coating the assembly comprised of the plurality of the waxed patterns on the sprue and resulting in production of a casting mold.
Figure 17:
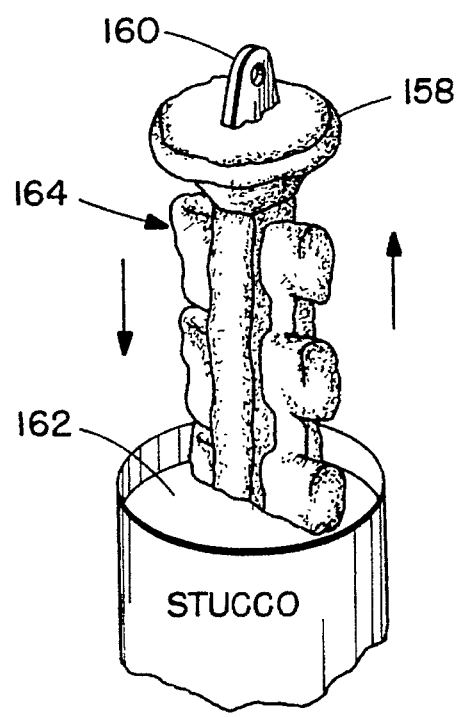
Figure 18:
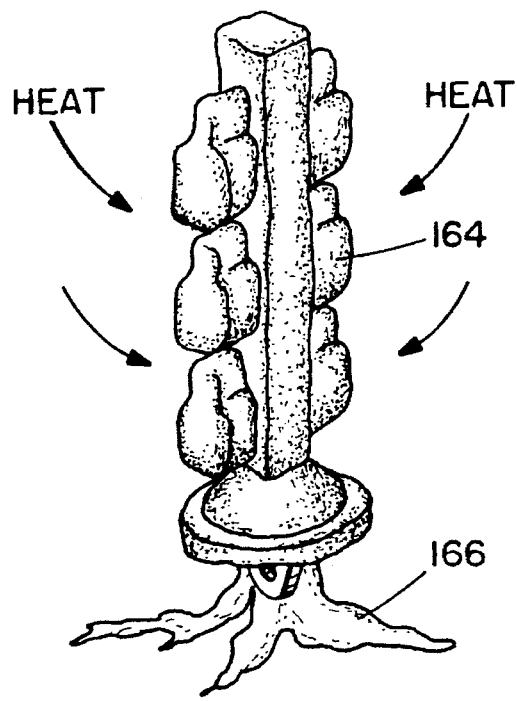
FIG. 18 is a detail perspective view of another subsequent step in the method of the invention, specifically, of subjecting the casting mold to heat to melt out the wax contained therein.
Figure 19:
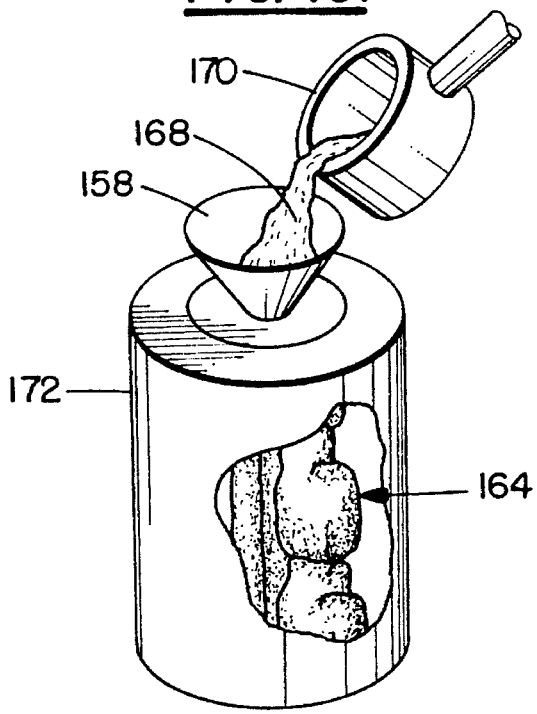
FIG. 19 is a detail diagrammatic perspective view of another subsequent step in the method of the invention, specifically, of pouring molten metal alloy into the interior of the casting mold to form a plurality of rough cast blades.

When a plurality of the waxed patterns 148 have been so attached to the sprue 152, the result is referred to as a wax assembly 156 or, alternatively, a pattern assembly. This assembly has to be "invested", however, before it is of any use to the foundry. A pouring cup 158 for use in a subsequent step of the casting process and a handle 160 for manipulating the assembly 156, in a manner to be described, are integral with the central sprue. A technique often used in aerospace casting, and preferred in the present instance, is to build up a ceramic shell gradually around the wax assembly 156. This is done through a series of steps in which the assembly 156 is dipped by holding the handle 160 in a ceramic slurry mix including binders and powders (FIG. 16) and is "sanded" with refractory grains, also called "stucco" and then dried between coatings. The process of dipping, sanding, and drying is repeated until the desired number of layers are built up creating a shell or casting mold 162. Anywhere from about six to 20 coatings are used in a typical aerospace investment casting mold. The material (ceramic slurry mix with binders and powders) of the casting mold 164 mechanically locks, clings and/or bonds to the exposed (i.e., not wax covered) ceramic core prints 70, 138 during shell buildup. Later, after the casting mold has been completely built up and dried (FIG. 17), and the wax will be melted away (FIG. 18), these core print areas lock and support the core 46 in the desired position in the casting mold 164 after the wax has been removed and the shell is ready for casting of the metal around it (FIG. 19). As in the case of the waxed pattern 148 and core depicted in FIG. 14, there are two print locations: root core print 138 and trailing edge core print 70.

At this stage, the casting mold 164 still has the waxed patterns 148 and sprue 152 inside of it and each core 46 is now attached to the casting mold by its associated core prints. At this point, the casting mold 164 is placed into a dewaxing furnace or a steam autoclave whose purpose is to heat the casting mold and melt away and remove the wax. FIG. 18 depicts heating the casting mold 164 upside down, pouring cup 158 down, so that all the wax melts and runs out the bottom, the melted wax being indicated by reference numeral 166. Sometimes plastic is used in patterns, rather than wax, but the same basic processing steps are followed.

At this point in the casting process, the casting mold 164 is hollow with the exception of the cores 46 that are still held in position by the core prints 70, 138 being locked in place by the hardened ceramic slurry mix 162. The space that used to occupied by wax or plastic is now ready to be filled with a casting metal 168 of a suitable metal alloy.

The next step is to melt the casting metal 168 (FIG. 19) and this is typically accomplished in either an air furnace or a vacuum furnace. The molten metal is illustrated being poured from a ladle 170 into the pouring cup 158 as the casting mold is supported in a suitable holder 172. The molten casting metal flows into the interior spaces earlier defined by the sprue 152, that is, interior spaces earlier occupied by the wax and around the cores which are still present. The casting mold 164 now filled with the molten metal is then cooled and, in time, the molten metal solidifies.

Figure 20:
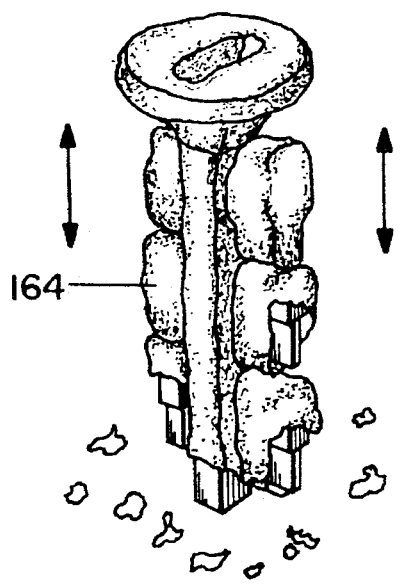
FIG. 20 is a detail perspective view of another subsequent step in the method of the invention, specifically, of removing the slurry coating applied in FIGS. 16 and 17 from the now-formed rough cast blades.

FIG. 20 illustrates the removal of the casting mold 164 from the solidified metal in a procedure referred to as "shakeout." The casting mold in this condition is subjected to vibration in a suitable manner and with sufficient energy to crack away or otherwise release the shell exposing the frozen metal formed within it. Occasionally, chemical means are employed to help. Water blast, shot peening, or grit blasting are other sometimes effective shell removal aids.

Figure 21:
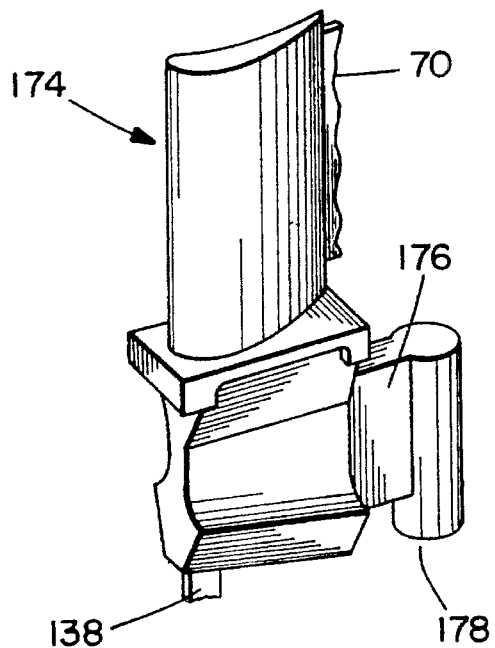
FIG. 21 is a detail perspective view of a rough cast blade resulting from the step illustrated in FIG. 20.

FIG. 21 illustrates a rough cast blade 174 which has been separated from its companions from the casting mold 164. Once down to bare metal, it is necessary to remove all appendages required for the casting process, but serving no purpose in the finished blade 20. Such illustrated appendages include a gate 176 and a runner 178. Together with "risers", not illustrated, these items refer to the basic elements of the "plumbing" or the molten metal distribution system in the mold. More specifically, gates form the connections from the sprue or runners to the individual blade patterns. Runners provide a path in the mold for molten metal to travel from the sprue to the gates leading into each part pattern. A riser is vertical mass of metal positioned in the metal distribution system intended to create a temperature gradient in the freezing shell. This promotes freezing from the parts towards the molten metal feed source, the runners, and the sprue. This helps insure that the casting will freeze with a minimum of pores and voids.

Once the rough cast blade. 174 has been separated from its plumbing, it is then time to start "finishing" it. In finishing, the cast parts are smoothed in the areas where there are defects, positive metal, parting lines from the injection die, and excess gate material. Also, it must be recalled that the core still remains inside the rough cast blade 174. See, for example, the remainder of the ceramic core prints 70, 138 in FIG. 21. By this time of course the core prints will have largely broken off but their remaining parts are illustrated in FIG. 21.

Figure 22:
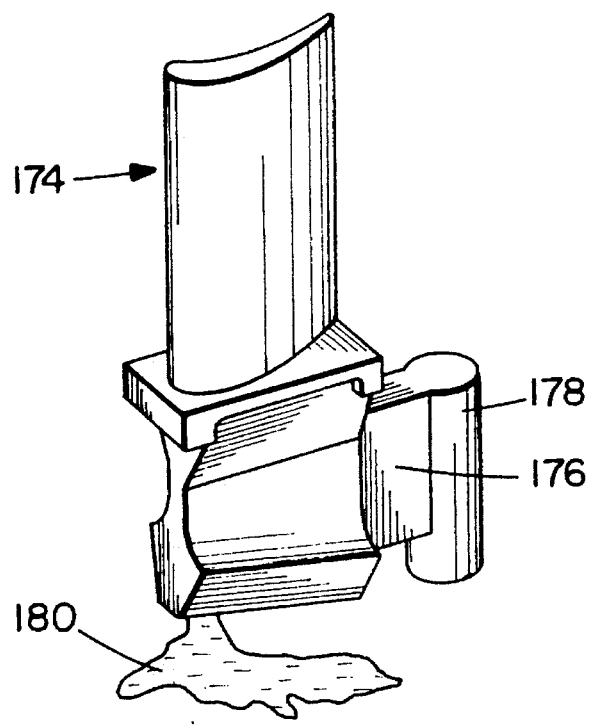
FIG. 22 is a detail perspective view of the rough cast blade and of another subsequent step in the method of the invention, specifically, of leaching the core from the interior of the blade.

Also, it will be recalled that the core 46 remains in place within the rough cast blade 174. This has to be leached out. FIG. 22 diagrammatically illustrates the step of leaching out the core from the casting. Residue 180 being a mixture of the leaching substance and of the ceramic core material is indicated. This step is performed with a high temperature, high pressure caustic solution to leach out the silica in the core to remove it without harming the rough cast blade. Typically potassium hydroxide and sodium hydroxide solutions are used for this purpose.

Figure 23:
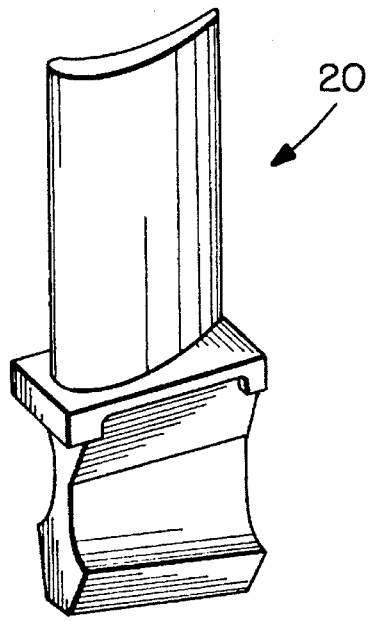
FIG. 23 is a detail perspective view generally illustrating a turbine blade resulting from the process illustrated in the foregoing drawings.

Appropriate surface finishing is then performed on the rough cast blade 174, resulting in the finished blade 20 illustrated in FIG. 23. In actual fact, FIG. 23 is identical to FIG. 1.

Consider, now, another aspect of the invention. This concerns coating of the laser processed core 46 to enhance its castibility in single crystal alloy castings. By "castability" is meant the ability of the molten single crystal alloy to flow into, fill, and soundly freeze within the core the fine intricate features which had been formed by the laser processing.

Once the core has been laser machined it can be utilized for casting either equiaxed, directionally solidified, or single crystal alloys. As its name implies, an equiaxed structure is one in which a multitude of uniform grains have approximately equal dimensions in all directions. However, in the casting process, some variation in the size of the grains will occur depending on how rapidly solidification occurs. Also some grains may be elongated or columnar as a result of the way heat is extracted from the solidifying metal.

Directionally solidified grains represent a unique form of columnar or elongated grains and are produced by unidirectional solidification of metal from a water cooled copper chill plate. As a result of this process, the metal part comprises parallel columnar grains of metal oriented perpendicular to the water cooled chill plate. Single crystals are a subset of directionally solidified metals in which one of the columnar grains is selected and allowed to grow into the mold cavity. This process can also be accomplished by using a single crystal "seed" to start the growth process. When making an equiaxed casting, fine detail in both the mold and core can be filled with metal prior to solidification. Laser machined fine detail as small as 0.005 inches has been able to be cast. However, in single crystal and directionally solidified processes, the filling of fine detail features in the mold has proven to be difficult. It is thought that this is a result non-wetting of the core or mold by the molten alloy. This non-wetting condition is believed related to surface energy considerations, that is, the inability of the hydrostatic forces inherent in the casting process to completely coat all surfaces, features, depressions, and the like, of the core 46. More specifically, where "wetting" occurs, it requires the creation of molten alloy/core interface while there is a corresponding loss of the vacuum (or air)/core interface. For wetting to be thermodynamically feasible, there has to be a net reduction of the overall free energy of the system. The casting forces help overcome the energy barrier that may exist in replacing vacuum/core with alloy/core interface. Single crystal casting is inherently a less forceful process than equiax casting where the metal is virtually "dumped" rapidly into the mold during casting.

A method of overcoming this inability to consistently cast fine details has been developed. The procedure comprises producing a layer on the core surface that has a very high surface energy. This high surface energy promotes the wetting or flowing of the alloy into areas that would not normally fill because of thermodynamic energy considerations. Satisfactory results have been achieved by applying to the surface of the fired core a coating of a wetting material having a surface energy in excess of approximately 750 dynes per centimeter.

In this instance, the creation of an alloy coated core surface reduces the overall energy of the system because of the high starting surface energy of the vacuum/coated core interface. The result is analogous to wicking of water into fine capillaries or small crevices.

Various methods have been utilized to produce this active layer on the core. One method comprises the dipping or painting of the core with a material that includes a high melting point metal such as platinum or gold which is combined with organic compounds to form what is termed an organo-metallic material. More specifically, the wetting material is a metallo-organic compound containing at least one metal having a high melting point selected from the group consisting of (1) those metals listed in the Periodic Table in Group 1-b: copper, silver, gold; (2) those metals listed in the Periodic Table in Group 8-b: iron, ruthenium, osmium; (3) those metals listed in the Periodic Table in Group 9-b: cobalt, rhodium, iridium; and (4) those metals listed in the Periodic Table in Group 10-b: nickel, palladium, platinum.

The fired core with the wetting material thereon is then heated to a temperature in the range of approximately 400° C. to 600° C. to drive off the organic compound. This leaves only the high temperature metal on the outer surface of the fired core. It may be desirable to perform the coating and heating procedure just described two or more times in order to achieve sufficient thickness of metal on the core surface.

Another method comprises plating nickel metal onto the surface of the core. In this case, an electroless process is employed which does not require an electromotive external driving source. The surface of the core is activated with the organo-metallic platinum or gold material or the like as just described. Then, the ceramic core is placed into an electroless nickel bath, a heated solution of nickel salts, to thereby form an electroless nickel coating on the surfaces of the core. The core is withdrawn from the heated solution when a sufficient thickness of the electroless nickel has been deposited on the surfaces of the core.

Still another method employs ion sputtering techniques to coat the core surface with titanium diboride and titanium carbide material. This process utilizes special chambers where material from a target is transferred to the sample by the target being bombarded with ions which dislodge the target atoms and these are allowed to interact with the sample.

Other methods of applying a surface layer, such as electroplating, chemical vapor deposition, physical vapor deposition, and the like could be employed together with the disclosed manner of formulating the core with active ingredients which promote the wetting of metal.

While preferred embodiments of the invention have been disclosed in detail, it should be understood by those skilled in the art that various other modifications may be made to the embodiments disclosed without departing from the scope of the invention as described in the specification and defined in the appended claims.

What is claimed is:

1. A method of producing a core for making a hollow blade comprising the steps of:
   (a) molding a green ceramic core having outer surfaces generally contoured to produce the intended interior surfaces of the completed blade;
   (b) heating the green ceramic core to a sufficient extent to produce a fired core; and
   (c) operating on the fired core with a laser to modify the characteristics of the fired core.

2. A method of producing a core for making a hollow blade as set forth in claim 1
   wherein step (c) includes the step of:
   (d) applying the laser in such a manner that the outer surface of the fired core is smoothened.

3. A method of producing a core for making a hollow blade as set forth in claim 1
   wherein step (c) includes the step of:
   (d) applying the laser to the surface of the fired core in such a manner that the outer surface of the core is strengthened.

4. A method of producing a core for making a hollow blade as set forth in claim 1
   wherein step (a) includes the steps of:
   (d) positioning opposed mating core dies into juxtaposed relationship such that mutually opposed faying surfaces are proximately engaged; and
   (e) injecting ceramic material into the cavity defined by opposed core dies; and
   wherein step (c) includes the step of:
   (f) directing the laser to remove excessive amounts of fired core material which intrudes between the mutually opposed faying surfaces during step (e).

5. A method of producing a core for making a hollow blade as set forth in claim 1
   wherein step (c) includes the step of:
   (d) cutting detailed features into the outer surfaces of the fired core by means of the laser.

6. A method of producing a core for making a hollow blade as set forth in claim 1
   wherein step (c) includes the step of:
   (d) using the laser to mill the outer surfaces of the fired core.

7. A method of producing a core for making a hollow blade as set forth in claim 1
   wherein step (c) includes the step of:
   (d) using the laser to heat localized outer surfaces of the fired core to a temperature at which glazing occurs.

8. A method of producing a core for making a hollow blade as set forth in claim 1
   wherein step (a) includes the step of:
   (d) providing temporary tie bar means for core stability during step (b); and
   wherein step (c) includes the step of:
   (d) directing the laser to remove the temporary tie bar means from the fired core.

9. A method of producing a core for making a hollow blade as set forth in claim 1
   wherein step (c) includes the step of:
   (d) forming indicia on the outer surfaces of the fired core which will subsequently, upon completion of a molding process, be x-ray readable on the interior surfaces of the completed blade.

10. A method of producing a core for making a hollow blade as set forth in claim 9
    wherein step (d) includes the step of:
    (e) operating the laser at a level of power such that the laser beam only superficially ablates the surface of the fired ceramic core.

11. A method of producing a core for making a hollow blade as set forth in claim 1
    wherein step (c) includes the step of:
    (d) drilling holes into the outer surfaces of the fired core by means of the laser.

12. A method of producing a core for making a hollow blade as set forth in claim 11
    wherein step (d) includes the step of:
    (e) punching holes into the outer surfaces of the fired core by centering the axis of the laser beam on the axis of the hole being formed.

13. A method of producing a core for making a hollow blade as set forth in claim 11
    wherein step (d) includes the step of:
    (e) using the laser to cut at least one disk having a desired diameter out of the outer surfaces of the fired core by directing the axis of the laser beam transverse to the plane of the outer surfaces at a plurality of locations substantially equidistant from the axis of the disk being removed.

14. A method of producing a core for making a hollow blade as set forth in claim 11
    wherein step (d) includes the step of:
    (e) using the laser to cut out of the outer surface of the fired core a disk having an irregular boundary by directing the axis of the laser beam transverse to the plane of the outer surface thereof.

15. A method of producing a core for making a hollow blade as set forth in claim 1 including the steps, after step (a) and before step (b), of:
    (d) ejecting the green ceramic core from the core mold;
    (e) placing the green ceramic core on refractory supporting means; and
    (f) introducing the green ceramic core and refractory supporting means to the interior of a high temperature kiln.

16. A method of producing a core for making a hollow blade as set forth in claim 15 including the steps, after step (b), of:
    (g) removing the fired core from the kiln and from the refractory supporting means;
    (h) placing the fired core on refractory supporting means;
    (i) holding the fired core stationary on the refractory supporting means while performing step (c).

17. A method of producing a core for making a hollow blade as set forth in claim 1 wherein step (c) includes the step of:

(d) operating the laser to form specific detailed features on the fired core desired for the interior passages of the completed blade.

18. A method of producing a core for making a hollow blade as set forth in claim 17 wherein step (d) includes the step of:

(e) operating the laser with a level of power adequate for melting and vaporizing the fired ceramic core so as to produce the specific detailed features desired.

19. A method of producing a core for making a hollow blade as set forth in claim 17 wherein the transverse dimension of the specific detailed features is less than approximately 0.020 inches.

20. A method of producing a core for making a hollow blade as set forth in claim 17 including the steps of:

(e) depositing a catalyst onto the surface of the fired core; and (f) after step (e), immersing the fired core with the catalyst surface thereon into a heated solution of nickel salts to thereby form an electroless nickel coating on the surfaces of the core; and (g) withdrawing the fired core from the heated solution when a sufficient thickness of the electroless nickel has been deposited on the surfaces thereof.

21. A method of producing a core for making a hollow blade as set forth in claim 20 wherein the wetting material is a metallo-organic compound containing at least one metal having a high melting point selected from the group consisting of: copper, silver, gold, iron, ruthenium, osmium cobalt, rhodium, iridium, nickel, palladium, and platinum.

22. A method of producing a core for making a hollow blade as set forth in claim 17 wherein the transverse dimension of the specific detailed features is less than approximately 0.020 inches; and including the step of:

(d) applying to the surface of the fired core a coating of a wetting material having a surface energy in excess of approximately 750 dynes per centimeter.

23. A method of producing a core for making a hollow blade as set forth in claim 22 wherein step (d) is performed by an electroplating process.

24. A method of producing a core for making a hollow blade as set forth in claim 22 wherein step (d) is performed by a chemical vapor deposition process.

25. A method of producing a core for making a hollow blade as set forth in claim 22 wherein step (d) is performed by a physical vapor deposition process.

26. A method of producing a core for making a hollow blade as set forth in claim 22 wherein step (d) includes the step of:

(e) applying to the surface of the fired core by an ion sputtering process a coating of a material selected from the group consisting of titanium diboride and titanium carbide;

wherein step (c) includes the step of:

(d) operating the laser to form specific detailed features on the fired core desired for the interior passages of the completed blade.

27. A method of producing a core for making a hollow blade as set forth in claim 22 wherein the wetting material is a metallo-organic compound containing at least one metal having a high melting point selected from the group consisting of: copper, silver, gold; iron, ruthenium, osmium, cobalt, rhodium, iridium, nickel, palladium, and platinum.

28. A method of producing a core for making a hollow blade as set forth in claim 27 wherein step (d) includes the steps of:

(e) heating the fired core with the wetting material thereon to a temperature in the range of approximately 400° C. to 600° C. to drive off the organic compound thereby leaving only the high temperature metal on the outer surface of the fired core.

29. A method of producing a core for making a hollow blade as set forth in claim 28 wherein steps (d) and (e) are performed at least twice.

30. A method of producing a core for making a hollow blade as set forth in claim 28 including the step of:

(f) after steps (d) and (e), immersing the fired core into an electroless nickel bath to form a nickel coating onto the outermost surface of the core.

31. A method of making a hollow blade comprising the steps of:

(a) molding a green ceramic core having outer surfaces generally contoured to produce the intended interior surfaces of the completed blade;

(b) heating the green ceramic core to a sufficient extent to produce a fired core;

(c) operating on the fired core with a laser to modify the characteristics of the fired core;

(d) inserting the modified fired core into a wax injection mold having the negative contour of a desired blade;

(e) injecting molten wax into the wax injection mold to form a wax mold/core combination;

(f) removing the wax mold/core combination from the wax injection mold;

(g) generously coating the wax mold/core combination with a ceramic slurry;

(h) causing the ceramic slurry applied in step (g) to harden so as to form an outer shell;

(h) heating the outer shell to melt the wax of the wax mold/core combination within the interior of the outer shell;

(i) draining off the melted wax from the interior of the outer shell;

(j) pouring molten alloy into the interior of the outer shell to thereby fill the cavity defined by the interior surfaces of the outer shell and the surfaces of the fired core;

(k) allowing the alloy to solidify to form a casting having a desired external surface with the desired contour; and (l) leaching out the fired core from the interior of the casting substantially resulting in the desired hollow blade.

32. A method of making a hollow blade as set forth in claim 31 wherein step (c) includes the step of:

(d) operating the laser in such a manner that the surface of the fired core is smoothened.

33. A method of making a hollow blade as set forth in claim 31 wherein step (c) includes the step of:

(d) directing the beam of the laser to the surface of the fired core in such a manner that the surface of the core is strengthened.

OTHER PUBLICATIONS

34. A method of making a hollow blade as set forth in claim 31
wherein step (a) includes the steps of:
(d) positioning opposed mating core dies into juxtaposed relationship such that mutually opposed faying surfaces are proximately engaged; and
(e) injecting ceramic material into the cavity defined by opposed core dies; and
wherein step (c) includes the step of:
(f) directing the laser to remove excessive amounts of fired core material which intrudes between the mutually opposed faying surfaces during step (e).

35. A method of making a hollow blade as set forth in claim 31
wherein step (c) includes the step of:
(d) cutting detailed features into the outer surfaces of the fired core by means of the laser.

36. A method of making a hollow blade as set forth in claim 31
wherein step (c) includes the step of:
(d) using the laser to mill the outer surfaces of the fired core.

37. A method of making a hollow blade as set forth in claim 31
wherein step (c) includes the step of:
(d) using the laser to heat localized outer surfaces of the fired core to a temperature at which glazing occurs.

38. A method of making a hollow blade as set forth in claim 31
wherein step (a) includes the step of:
(d) providing temporary tie bar means for core stability during step (b); and
wherein step (c) includes the step of:
(d) directing the laser to remove the temporary tie bar means from the fired core.

39. A method of making a hollow blade as set forth in claim 32
wherein step (d) includes the step of:
(e) operating the laser with a level of power adequate for melting and vaporizing the fired ceramic core so as to produce the specific detailed features desired.

40. A method of making a hollow blade as set forth in claim 39
wherein the laser used in steps (c) and (d) is a $CO_2$ laser.

41. A method of making a hollow blade as set forth in claim 31
wherein step (c) includes the step of:
(d) forming indicia on the outer surfaces of the fired core which will subsequently, upon completion of a molding process, be x-ray readable on the interior surfaces of the completed blade.

42. A method of making a hollow blade as set forth in claim 41
wherein step (d) includes the step of:
(e) operating the laser at a level of power such that the laser beam therefrom only superficially ablates the surface of the fired ceramic core.

43. A method of making a hollow blade as set forth in claim 42
wherein the laser used in steps (c) and (e) is a YAG laser.

44. A method of making a hollow blade as set forth in claim 31
wherein step (c) includes the step of:
(d) drilling holes into the outer surfaces of the fired core by means of the laser.

45. A method of making a hollow blade as set forth in claim 44
wherein step (d) includes the step of:
(e) punching holes into the outer surfaces of the fired core by centering the axis of the laser beam on the axis of the hole being formed.

46. A method of making a hollow blade as set forth in claim 44
wherein step (d) includes the step of:
(e) using the laser to cut at least one disk having a desired diameter out of the outer surfaces of the fired core by directing the axis of the laser beam transverse to the plane of the outer surfaces at a plurality of locations substantially equidistant from the axis of the disk being removed.

47. A method of making a hollow blade as set forth in claim 44
wherein step (d) includes the step of:
(e) using the laser to cut out of the outer surface of the fired core a disk having an irregular boundary by directing the axis of the laser beam transverse to the plane of the outer surface thereof.

48. A method of making a hollow blade as set forth in claim 31 including the steps, after step (a) and before step (b), of:
(d) ejecting the green ceramic core from the core mold;
(e) placing the green ceramic core on refractory supporting means; and
(f) introducing the green ceramic core and refractory supporting means to the interior of a high temperature kiln.

49. A method of making a hollow blade as set forth in claim 48 including the steps, after step (b), of:
(g) removing the fired core from the kiln and from the refractory supporting means;
(h) placing the fired core on refractory supporting means;
(i) holding the fired core stationary on the refractory supporting means while performing step (c).

50. A method of making a hollow blade as set forth in claim 31
wherein step (c) includes the step of:
(d) operating the laser to form specific detailed features on the fired core desired for the interior passages of the completed blade.

51. A method of making a hollow blade as set forth in claim 50
wherein the transverse dimension of the specific detailed features is less than approximately 0.020 inches.

52. A method of making a hollow blade as set forth in claim 50 including the steps of:
(e) depositing a catalyst onto the surface of the fired core; and
(f) after step (e), immersing the fired core with the catalyst surface thereon into a heated solution of nickel salts to thereby form an electroless nickel coating on the surfaces of the core; and
(g) withdrawing the fired core from the heated solution when a sufficient thickness of the electroless nickel has been deposited on the surfaces thereof.

53. A method of making a hollow blade as set forth in claim 52 wherein the wetting material is a metallo-organic compound containing at least one metal having a high melting point selected from the group consisting of: copper, silver, gold, iron, ruthenium, osmium, cobalt, rhodium, iridium, nickel, palladium, and platinum.

54. A method of making a hollow blade as set forth in claim 50 wherein the transverse dimension of the specific detailed features is less than approximately 0.020 inches; and including the step of:

(d) applying to the surface of the fired core a coating of a wetting material having a surface energy in excess of approximately 750 dynes per centimeter.

55. A method of making a hollow blade as set forth in claim 54 wherein step (d) is performed by an electroplating process.

56. A method of making a hollow blade as set forth in claim 54 wherein step (d) is performed by a chemical vapor deposition process.

57. A method of making a hollow blade as set forth in claim 54 wherein step (d) is performed by a physical vapor deposition process.

58. A method of making a hollow blade as set forth in claim 54 wherein step (d) includes the step of:

(e) applying to the surface of the fired core by an ion sputtering process a coating of a material selected from the group consisting of titanium diboride and titanium carbide.

59. A method of making a hollow blade as set forth in claim 54 wherein the wetting material is a metallo-organic compound containing at least one metal having a high melting point selected from the group consisting of: copper, silver, gold; iron, ruthenium, osomium; cobalt, rhodium, iridium nickel, palladium, and platinum.

60. A method of producing a core for making a hollow blade as set forth in claim 59 wherein step (d) includes the steps of;

(e) heating the fired core with the wetting material thereon to a temperature in the range of approximately 400° C. to 600° C. to drive off the organic compound thereby leaving only the high temperature metal on the outer surface of the fired core.

61. A method of producing a core for making a hollow blade as set forth in claim 60 wherein steps (d) and (e) are performed at least twice.

62. A method of making a hollow blade as set forth in claim 60 including the step of:

(f) after steps (d) and (e), immersing the fired core into an electroless nickel bath to form a nickel coating onto the outermost surface of the core.

\* \* \* \* \*

UNITED STATES PATENT AND TRADEMARK OFFICE
CERTIFICATE OF CORRECTION

PATENT NO. : 5,465,780
DATED : November 14, 1995
INVENTOR(S) : Michael S. Muntner and James S. Perron It is certified that error appears in the above-identified patent and that said Letters Patent is hereby corrected as shown below:

Col. 23, line 3, delete "OTHER PUBLICATIONS";

and at line 42, change "32" to --50--.

Signed and Sealed this

Sixth Day of February, 1996

Attest:

BRUCE LEHMAN

*Attesting Officer*  *Commissioner of Patents and Trademarks*